(12) United States Patent
Paljug

(10) Patent No.: US 8,452,998 B2
(45) Date of Patent: May 28, 2013

(54) SYSTEMS AND METHODS FOR WAKING WIRELESS LAN DEVICES

(75) Inventor: Michael Paljug, Palm Bay, FL (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

(21) Appl. No.: 13/361,472

(22) Filed: Jan. 30, 2012

(65) Prior Publication Data

US 2012/0131369 A1 May 24, 2012

Related U.S. Application Data

(60) Division of application No. 12/168,706, filed on Jul. 7, 2008, now Pat. No. 8,156,360, which is a continuation of application No. 10/995,188, filed on Nov. 24, 2004, now Pat. No. 7,398,408.

(51) Int. Cl.
*G06F 1/00* (2006.01)

(52) U.S. Cl.
USPC .......................................... 713/320; 713/323

(58) Field of Classification Search
USPC .................................................. 713/320, 323
See application file for complete search history.

(56) References Cited

U.S. PATENT DOCUMENTS

| | | |
|---|---|---|
| 5,802,305 A | 9/1998 | McKaughan et al. |
| 5,898,904 A | 4/1999 | Wang |
| 5,938,771 A | 8/1999 | Williams et al. |
| 6,049,885 A | 4/2000 | Gibson et al. |
| 6,052,779 A | 4/2000 | Jackson et al. |
| 6,094,443 A | 7/2000 | Dwork |
| 6,101,608 A | 8/2000 | Schmidt et al. |
| 6,134,665 A | 10/2000 | Klein et al. |
| 6,272,628 B1 | 8/2001 | Aguilar et al. |
| 6,304,899 B1 | 10/2001 | Cromer et al. |
| 6,311,276 B1 | 10/2001 | Connery et al. |
| 6,366,957 B1 | 4/2002 | Na |
| 6,393,570 B1 | 5/2002 | Henderson et al. |
| 6,415,387 B1 | 7/2002 | Aguilar et al. |
| 6,493,824 B1 | 12/2002 | Novoa et al. |
| 6,513,128 B1 | 1/2003 | Wang et al. |
| 6,526,507 B1 | 2/2003 | Cromer et al. |
| 6,591,368 B1 | 7/2003 | Ryu |
| 6,606,709 B1 | 8/2003 | Connery et al. |

(Continued)

OTHER PUBLICATIONS

AMD Magic Pack Technology, http://www.amd.com/us-en/ConnectivitySolutions/TechnicalResources/ Apr. 7, 2004, pp. 1-3.

(Continued)

*Primary Examiner* — Chun Cao

(57) ABSTRACT

A system and method for wireless waking computing devices over a computer network is provided. A signal is broadcast over the network that includes one or more device specific wake-up data sequences. Each device specific wake-up data sequence includes multiple iterations of the hardware address of the wireless network card associated with that device. While in a reduced power or "sleep mode", the wireless network card monitors wireless channels for packets containing a wake-up data sequence. If a wake-up data sequence is received, the sequence is matched against the hardware address information for that network card. If a match is determined, the network card sends a signal to the computing device causing full system power to be restored. A signal is sent to the network confirming that the device has been successfully woken from the sleep mode.

20 Claims, 6 Drawing Sheets

U.S. PATENT DOCUMENTS

| | | |
|---|---|---|
| 6,615,383 B1 * | 9/2003 | Talluri et al. .................. 714/749 |
| 6,701,442 B1 | 3/2004 | Kunz et al. |
| 6,848,059 B2 | 1/2005 | Bullman et al. |
| 6,891,821 B2 | 5/2005 | Krishnakumar et al. |
| 6,934,870 B1 | 8/2005 | Amos |
| 6,993,670 B2 | 1/2006 | Weng et al. |
| 8,156,360 B2 * | 4/2012 | Paljug ........................... 713/323 |
| 2002/0132603 A1 | 9/2002 | Lindskog et al. |
| 2002/0162038 A1 | 10/2002 | Bullman et al. |
| 2003/0097398 A1 | 5/2003 | Knox et al. |
| 2003/0198196 A1 | 10/2003 | Bahl |
| 2003/0202477 A1 * | 10/2003 | Zhen et al. .................... 370/248 |
| 2003/0204746 A1 | 10/2003 | Cromer et al. |
| 2003/0210658 A1 | 11/2003 | Hernandez et al. |
| 2004/0105421 A1 | 6/2004 | Maki et al. |
| 2004/0254978 A1 | 12/2004 | Ibanez et al. |
| 2004/0264396 A1 | 12/2004 | Ginzburg et al. |
| 2005/0021711 A1 | 1/2005 | Stieger et al. |
| 2005/0122926 A1 | 6/2005 | Cromer et al. |
| 2005/0215274 A1 | 9/2005 | Matson et al. |
| 2006/0041615 A1 | 2/2006 | Blank et al. |

OTHER PUBLICATIONS

AMD Magic Packet Technology, White paper, Publication No. 20213, Nov. 1995, 5 pages.

Final Office Action on U.S. Appl. No. 12/168,706, mailed Aug. 22, 2011.

International Preliminary Report on Patentability for PCT/US2005/042369, issued May 30, 2007.

International Search Report for PCT/US2005/042369, mailed Oct. 3, 2006.

Non-Final Office Action on U.S. Appl. No. 12/168,706, mailed Mar. 22, 2011.

Notice of Allowance on U.S. Appl. No. 12/168,706, mailed Nov. 14, 2011.

Wrritten Opinion for PCT/US2005/42369, mailed Oct. 3, 2006.

* cited by examiner

200

DESTINATION SOURCE MISCELLANEOUS FF FF FF FF
FF FF FF 1B 2B 3B 4B 5B 6B 1B 2B 3B 4B 5B 6B 1B
2B 3B 4B 5B 6B 1B 2B 3B 4B 5B 6B 1B 2B 3B 4B 5B
6B 1B 2B 3B 4B 5B 6B 1B 2B 3B 4B 5B 6B 1B 2B 3B
4B 5B 6B 1B 2B 3B 4B 5B 6B 1B 2B 3B 4B 5B 6B 1B
2B 3B 4B 5B 6B 1B 2B 3B 4B 5B 6B 1B 2B 3B 4B 5B
6B 1B 2B 3B 4B 5B 6B 1B 2B 3B 4B 5B 6B 1B 2B 3B
4B 5B 6B MISCELLANEOUS CRC

SYSTEMS AND METHODS FOR WAKING WIRELESS LAN DEVICES

CROSS-REFERENCE TO RELATED PATENT APPLICATIONS

This application is a Divisional of U.S. application Ser. No. 12/168,706, filed Jul. 7, 2008, which is a Continuation of U.S. application Ser. No. 10/995,188, filed Nov. 24, 2004 (now U.S. Pat. No. 7,398,408), both of which are incorporated herein by reference in their entirety.

FIELD

The present disclosure relates to systems and methods for accessing computing devices over wireless local area networks and more particularly to systems and methods for waking computing devices from a powered down or sleep state with signals sent over wireless local area networks.

BACKGROUND

As computer usage in the workplace becomes ever more pervasive, efficient network administration becomes an increasingly complex task. In an office environment, individual computer terminals are typically networked to a server over a local area network (LAN) such as an Ethernet LAN. In a LAN, each computer communicates with the network through a LAN controller. Typically, the LAN controller is housed on a network interface card (NIC), sometimes called a LAN card or Ethernet card. However, recently, the LAN controllers are being integrated directly into computer motherboards. Each LAN controller is represented as a node on the LAN by a unique identification number. A server computer also connected to the LAN acts as the gateway to outside networks and as centralized data storage. From the administrator's end, LAN implementations allow administrative tasks such as software installation, virus scanning, file management, network email service, data backups, etc., to be performed over the network from a single central location. Through use of access levels, the network administrator may manage all the other computers or nodes on the network from his or her computer. From the user end, LAN implementations allow access to the Internet, shared file storage space and access to shared networked output devices, such as printers.

Due in part to the dynamic technology dependent nature of today's workplace, network administrators must constantly perform functions requiring access of individual network nodes from the administrator's computer. These functions can include configuring new nodes, updating and installing software, adding network printers, scanning for viruses, and file back-ups, to name a few. Typically, many of these administrative functions are scheduled for execution after normal business hours so as to minimize interference with user applications during the work day. However, during these after hour times, individual computers on the LAN may be in one of a variety of power conserving modes, also known as sleep modes. Typically, the power conserving modes cause the display to be put in a low power state, the hard drive to be spun down and even the microprocessor to reduce its clock frequency or to be shut down completely. Having the computers powered down can make it difficult if not impossibly to schedule and implement after hours network events. If the administrator has to physically turn on each machine, at least some of the efficiencies of centralized network administration are lost.

This problem of needing to wake-up computers over the LAN led to the invention of a protocol known as MAGIC PACKET technology. MAGIC PACKET technology is a proprietary hardware solution incorporated into the card or board-based Ethernet controller for waking up a PC over the LAN developed and owned by Advanced Micro Devices, Inc. of Sunnyvale, Calif. Before entering a powered down or sleep mode, the LAN controller is put into a MAGIC PACKET mode. In this mode, the device will no longer generate any network transmits, but will monitor all incoming frames to determine if any of them is a MAGIC PACKET frame. The LAN controller will scan all incoming frames addressed to the node for a specific data sequence, which indicates to the controller that this is a MAGIC PACKET frame. A MAGIC PACKET frame must meet the general requirements for the specific LAN technology employed, such as SOURCE ADDRESS, DESTINATION ADDRESS and CRC. Also in the frame is the MAGIC PACKET, which is a specific sequence consisting of 16 duplications of the IP address of the specific node. The sequence can be located anywhere within the packet, but must be preceded by a synchronization stream. The synchronization stream allows the scanning state machine to be much simpler by identifying the location of the sequence.

If the address matching circuit determines that the MAGIC PACKET for that node has arrived, the MAGIC PACKET mode is disabled and full power is restored to the system allowing the network administrator to perform data backups, software installations, etc. Alternatively, full power may be restored by conventional means such as depressing a key on the keyboard or moving/clicking the mouse. After the desired operation has been performed, or after a sufficient time period has expired, a command signal may be sent the node over the LAN to return the node to the power saving MAGIC PACKET MODE. Because the LAN controller already has built-in address matching circuitry in order to recognize regular frames addressed to the node, implementation of MAGIC PACKET technology is simplified. For a full description of MAGIC PACKET technology refer to U.S. Pat. No. 6,049,885 hereby incorporated by reference in its entirety.

Due in part to advances in liquid crystal displays and battery technology as well as reductions in disk drive and circuit board size, demand for laptop, palmtop and other wireless computer devices has grown significantly. The typical LAN is no longer comprised only of desktop computers physically tethered to the network. Instead, today's office environment consists of a mixture of wired and wireless computer devices which often have their own internal wireless cards. Also, in order to avoid the expense of retrofitting office space with network communication cables, wireless network cards are even being used with stationary desktop-type computers. As a result, the need arose to extend the functionality of LAN access to wireless devices. To accommodate this need, a standard for wireless LAN, known as IEEE 802.11x was created. Using one or more wireless access points (APs), distributed throughout an office space, wireless devices are able to seamlessly connect to the LAN in a manner identical to and at speeds comparable to tethered workstations over short distances. Each wireless device has a wireless network interface card with a transceiver that facilitates two way communication with the AP. The AP has a service set identifier (SSID) which is a 32 character identifier attached to the header of packets sent over the wireless LAN (WLAN). The SSID differentiates one WLAN from another. All access points and all devices attempting to connect to a specific WLAN must use the same SSID. Each node on the WLAN has a unique hardware destination address that uniquely identifies that node.

The presence of wireless device nodes on the LAN complicates the implementation of wake-up over the LAN. Firstly, wireless devices are not always plugged into a permanent power source. Usually, these devices are capable of running off line power or their own internal batteries. Secondly, wireless devices access the LAN by communicating with a specific access point. Thus, in order for the network administrator to send a message to a particular node, he must know the SSID of the access point that the wireless device communicates with. However, because of the portable nature of wireless devices, the administrator may not know the location of the each device within the premises, and thus, the access point with which each device will communicate. As a result, it becomes difficult to address a wake-up signal to specific devices knowing only the destination address of each device.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

Therefore, it would be desirable to provide a system for wirelessly waking computer devices out of reduced power or sleep mode over a wireless local area network. It would also be desirable to provide a network card for use with wireless devices that is capable of entering a wireless signal monitoring state and of monitoring received wireless signals while in the state for a wake up data sequence.

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

Disclosed herein are various exemplary mechanisms for achieving wake-over-wireless LAN. Also disclosed herein are various exemplary mechanisms for scanning a plurality of wireless channels in a wireless LAN with a wireless device to find a wake-up data sequence for that device, and then, waking the wireless device from a powered down mode when the wake up data sequence that device is received. Also disclosed herein is a power management scheme for use with a mini-PCI bus-based wireless network interface card for receiving wireless wake-on LAN signals.

In accordance with one embodiment of the present invention, a method for putting a wireless device into a reduced power mode such that the device can be wirelessly returned to a full power mode and for returning the device to a full power mode using signals transmitted over a wireless LAN is provided. The method comprises the steps of putting a device into a reduced power mode, activating a receiver to scan a plurality of wireless data channels for a MAGIC PACKET, scanning each channel for a predetermined time period, and if a MAGIC PACKET for that device is received, returning that device to a full power mode, otherwise, deactivating the receiver for another predetermined time period.

In accordance with an additional embodiment of the present invention, a wireless network controller is provided. The wireless network controller comprises a wireless transceiver operable to scan a plurality of data channels; power control circuitry for selectively supplying and withdrawing power to and from the transceiver, timing circuitry for controlling the period of time that power is supplied to and withdrawn from the transceiver, a comparator for comparing a data sequence received by the transceiver with a sequence stored in memory, and a controller for sending a wake-up signal when the received signal matches the sequence stored in memory.

In accordance with yet another embodiment of the present invention, a network interface card is provided. The network interface card comprises a connector for communicatively connecting the card to a wireless device and for supplying power to the card, a wireless transceiver for scanning a plurality of data channels, a power control circuit which is activated when the card receives a signal that the device has entered a power saving mode, a timing control circuit for controlling the time that power is supplied to and withdrawn from the transceiver, a comparator for comparing a data sequence received by the transceiver with a sequence stored in memory, and a controller for sending a wake-up signal in response to the output of the comparator.

In accordance with an additional embodiment of the present invention, a wireless device operable to go into a powered down mode and to be woken from the powered down mode when a wake-up data sequence for that device is received over a wireless LAN is provided. The wireless device comprises a power saving sleep mode operable to reduce or eliminate power to all components of the wireless device except a wireless network controller. The wireless device also comprises a wireless transceiver for monitoring a plurality of wireless channels for an incoming wake-up data sequence signal. The wireless device further comprises a comparator for comparing an incoming wake-up data sequence signals with a signal stored in memory and a controller for restoring power to the wireless device if the incoming wake-up data sequence matches a signal stored in memory.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the present invention by providing a number of specific embodiments and details involving the systems and methods which function to wake a wireless device from a powered down mode via a wireless local area network. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For the purposes of this disclosure, the terms "MAGIC PACKET" and "wake-up data sequence" will be used interchangeably to refer to a sequence of data contained in the frame data portion of a wireless LAN information packet which uniquely identifies one or more nodes on the wireless LAN.

Also, for the purposes of this disclosure the terms "sleep mode" "reduced power mode" and "power saving mode" will be used interchangeably to refer to a computing device operating state entered either upon initiation by a user or after expiration of a period of sufficient inactivity in which the amount of power supplied to the device is reduced as compared to amount supplied during normal operation. This may include, but not is not limited to sleep modes which are in compliance with U.S. Department of Energy Environmental Protection Agency (EPA) Energy Star certification. These sleep modes typically include some combination of reduced operating power, withholding or reducing power to peripheral devices, reduced CPU clock speed, spinning down of hard disc drives, etc.

For the purposes of this disclosure, the term "computing device" will refer to lap top computers, notebook computers, desk top computers, tablet computers, palm computers, and other computing devices comprising at least the fundamental components of a CPU, storage, a user interface and a communication bus.

For the purposes of this disclosure, the term "wireless network" will refer to a local network such as a local area network within a particular premises or discrete physical space, a distributed network such as a wide area wireless network, a collection of individual local area network and combinations thereof.

Figure 1:
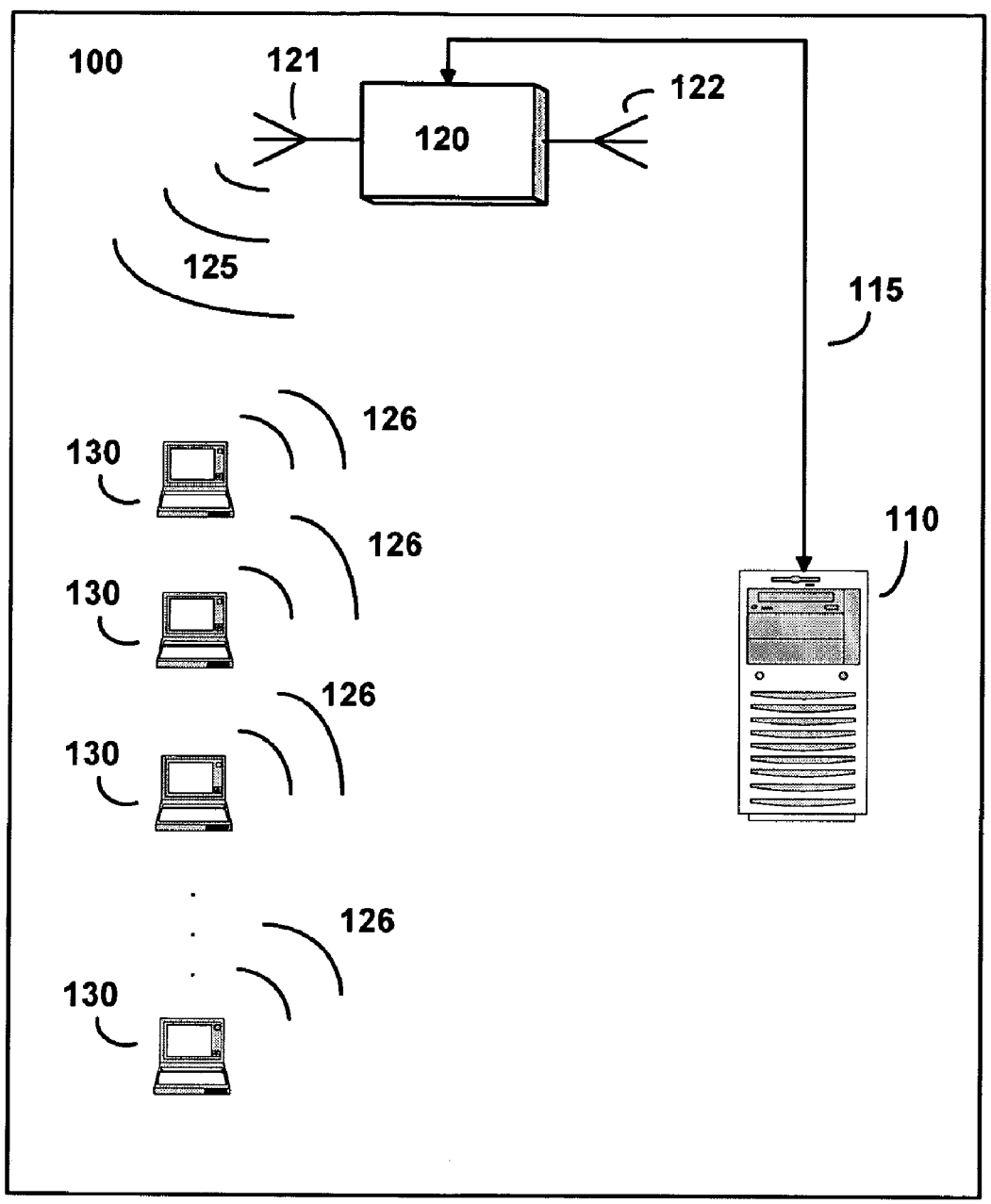
FIG. 1 is a diagram illustrating the elements of a typical wireless local area network in accordance with at least one embodiment of this invention.

FIG. 1 illustrates the basic elements of a wireless local area network (WLAN) 101 implemented at a customer premises 100. In various exemplary embodiments, the customer premises 100 may be an office environment comprising a plurality of wireless computing devices. However, in various other exemplary embodiments the customer premises 100 may be any other type of business or residential environment where at least one wireless device is utilized over a WLAN.

In FIG. 1, a server computer 110 is connected to a wireless access point (AP) 120 via an Ethernet cable 115. Typically, the one or more wireless access points 120 are mounted in elevated locations throughout the customer premises 101. The wireless access point 120 acts a transceiver to send data to and receive data from one or more wireless devices 130 communicating with the WLAN 101. In various exemplary embodiments, the wireless access point 120 will include a transmitting antenna 121 for transmitting the outbound LAN signal 125 and a receiving antenna 122 for receiving the inbound LAN signal 126. Also shown in FIG. 1, are a plurality of wireless computing devices 130. For purposes of example only, the wireless computing devices 130 shown in FIG. 1 are laptop computers. However, it should be appreciated that the wireless devices may be desktop computers, palm top computers, thin-client computers or various other computing devices. The present invention may be used with any and all types of computing devices communicating over a WLAN.

Referring again to FIG. 1, the wireless computing devices 130 will typically each have a wireless network controller (not shown in FIG. 1) with an antenna (not shown) for receiving and transmitting signals to and from the wireless access point 120. As discussed above, in various exemplary embodiments, the wireless network controller may be in the form of a separate card such as a PCMCIA card based network controller, a PCI card-based controller, a mini-PCI-based network controller or other card-based network controller. Alternatively, the wireless network controller may be built into a different type of card or module or even built directly onto the system board of the computing device. Each wireless computing device 130 activated on the WLAN 101 is considered a network node and is characterized by a hardware identification number. The wireless access point 120 is characterized to the wireless computing devices 130 by a unique SSID.

Communication between wireless computing devices 130 and the wireless access point 120 is based on data packets and is facilitated through the use the hardware identification number and the SSID. Thus, during operation, when data frames are sent to a particular wireless computing device 130 by the wireless access point 120, the wireless access point 120 broadcasts the information over the entire WLAN 101. Contained in each data frame of the signal 125 from the wireless access point is the destination address or unique identification of the particular wireless computing device 130 which is to receive the requested broadcast. Because the signal 125 is broadcast over the entire LAN 101, it is received by each wireless computing device 130 within the LAN 101. A comparator in the wireless network controller of each wireless computing device 130 compares the destination address contained in the data frames with its own destination address. If there is a match, the network controller transfers the data frame to its wireless device 130. Otherwise, the data frame is ignored. Similarly, during upstream data operations, each wireless computing device 130 must specify the SSID of the wireless access point 120 in order for the upstream data signal to be routed to the server 110. It should be noted that any wireless computing device 130 (network), not only the server computer 110, may be the source of the downstream data frame.

Figures 2, 3:
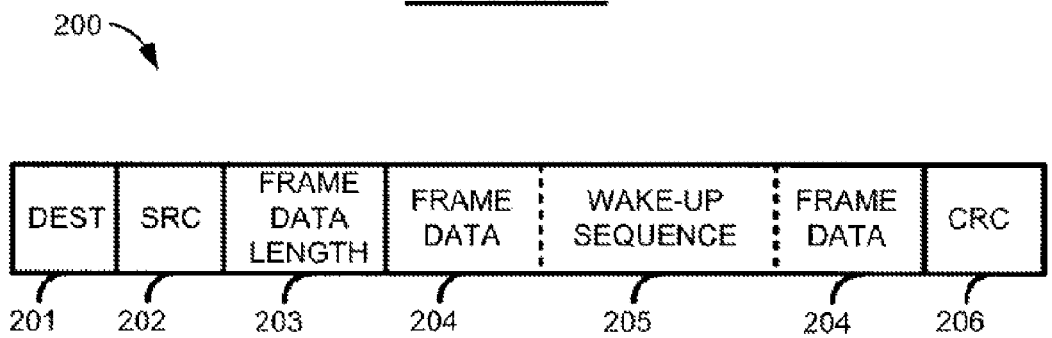
FIG. 2 illustrates the basic structure of a wireless LAN packet including a data frame containing wake-up data sequence in accordance with at least one embodiment of this invention.
FIG. 3 illustrates the internal composition of the frame data of an wireless LAN packet containing a node specific wake-up data sequence in accordance with at least one exemplary embodiment of this invention.

FIG. 2 illustrates the structure of an information packet 200 containing a wake-up data sequence for remotely waking at least one device node that is transmitted over the WLAN in accordance with at least one embodiment of this invention. As discussed above in the context of FIG. 1, this information packet 200 is generated by a source node remote from the wireless computing device receiving the information packet 200. The information packet 200 is partitioned into 6 different fields in accordance with basic LAN packet requirements. The first field contains the 6-byte Destination Address 201 which indicates the hardware address of the wireless computing device that is to receive the information packet 200. The second field contains the 6-byte Source Address 202 which indicates the hardware address of the source node that generated the information packet 200. The third field is a 2-byte length field which contains the length of the frame data within the information packet 200. The fourth field is the Frame Data block 204 which contains the actual information being transmitted. The Frame Data block 204 is a variable length field up to 1,404 bytes.

In a preferred embodiment, a 96-byte wake-up data sequence 205 is contained in the Frame Data block 204. The wake-up data sequence 205 comprises 16 consecutive repetitions of the Destination Address 201 embedded anywhere in the Frame Data block 204. The wake-sequence is the sequence of numbers that actually causes a specific wireless device to be woken from a sleep state. In various exemplary embodiments, the Frame Data block 204 may contain a wake-up data sequence 205 for a single wireless computing device. However, in various other embodiments, the Frame Data block 204 may contain a wake-up data sequence 205 for several or all wireless computing devices within the influence of the WLAN network. Finally, the last field of the information packet 200 contains a 4-byte Cyclic Redundancy Check (CRC) error control code 206 for verifying the integrity of the data contained in the Frame Data block 204. The format of packet-based communications signals is well known in the art. Therefore, a complete discussion of packet-based communication is intentionally omitted.

FIG. 3 illustrates an exemplary wake-up data sequence embedded in an information packet addressed to a wireless computing device having a hexadecimal based Ethernet hardware address of 1B:2B:3B:4B:5B:6B. In FIG. 3, for sake of simplicity, the Destination, Source and CRC fields are represented by their titles as opposed to their contents. Also, in FIG. 3, the portions of the Frame Data field surrounding the wake-up data sequence are denoted as Miscellaneous to highlight the wake-up data sequence. As shown in FIG. 3, the wake-up data sequence comprises 16 consecutive iterations of the hexadecimal hardware address of the receiving node. Also shown in FIG. 3, is a synchronization stream comprised of 6 bytes of FF in hexadecimal directly preceding the 16 consecutive iterations of the hardware address. The synchronization stream allows the hardware which compares the Frame Data against the known address to be implemented more simply.

Figure 4:
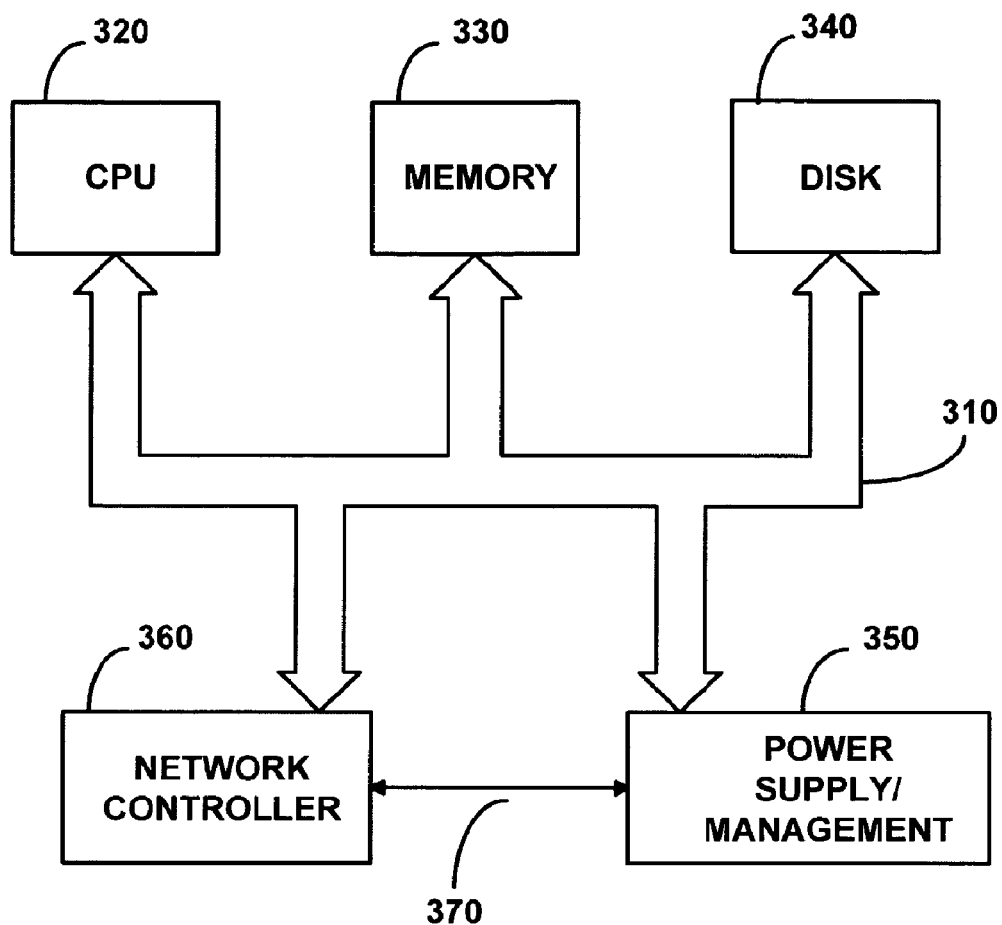
FIG. 4 is a block diagram illustrating the various internal components of a wireless device capable of entering a powered-down mode and further capable of being woken from a powered-down mode upon receipt of a wake-up data sequence over a wireless LAN in accordance with at least one exemplary embodiment of this invention.

The basic internal electronic system level components of an exemplary wireless computing device configured to accept wake-on wireless LAN in accordance with at least one embodiment of this invention are shown in block diagram form in FIG. 4. The wireless computing device shown in FIG. 4 is comprised of a microprocessor (CPU) 320, a memory 330, a hard disk 340, a network controller 350 and a power supply/management circuit 360, all interconnected by a data/power bus 310. It should be noted that the network controller 350 may be implemented directly on the system board of the wireless computing device or may be located on an attached bus board in electrically contact with the system board. Those having ordinary skill in the art will appreciate that the spirit and scope of this invention are not affected by the particular implementation of the network controller 350. Furthermore, it should also be appreciated that the power supply/management circuit 360 may comprise a power storage device, a physical connection to line power, or a combination of both. Also shown in FIG. 4 is a separate data/power bus 370 interconnecting the network controller 350 and the power supply/management circuit. In various exemplary embodiments, the separate data/power bus 370 will only pass data signals between the power supply/management circuit 350 and the network controller 360. In various other exemplary embodiments, the data/power bus 370 will supply power as well as passing data signals between the power supply/management circuit 350 and the network controller 360.

In a preferred embodiment, the network controller 350 is connected to the wireless computing device by way of the PCI or mini PCI bus architecture. The advantage of the PCI bus architecture in this application is that the PCI bus supports both a 3V line and a 3.3 Vaux. Therefore, when the PCI bus in a D3cold state, that is when the PCI clock is disabled and the PCI bus power is disabled, 3.3 volts is supplied to the card on the 3.3 Vaux power rail. The 3.3 Vaux power rail can be used to supply power to the wireless wake-on-LAN enabled network card while the computing device is in the sleep mode. Therefore, little or no modification of computing devices will be necessary to make them compatible with wireless wake-on-LAN enabled network interface cards.

In a preferred embodiment, the wireless computing device of FIG. 4 is located within the influence a wireless LAN. In various exemplary embodiments, the device may already be configured to operate as a node on the wireless LAN. In various other exemplary embodiments, the device may not yet be configured to operate as a node on the wireless network. In order to maximize power savings in the sleep mode, when the wireless computing device enters a sleep mode, the power supply/management circuit 360 preferably shuts down power to the system bus 310, CPU 320, memory 330 and hard disk 340. In order to speed up restart time, the current contents of the memory 330 may be stored in the hard disk 340. The power management/supply circuit then sends a signal to the wireless network controller activating the wake-on wireless LAN mode over the separate data/power bus 370 so that the wireless computing device may be woken from the sleep mode upon receipt of the appropriate wake-up data sequence.

Figure 5:
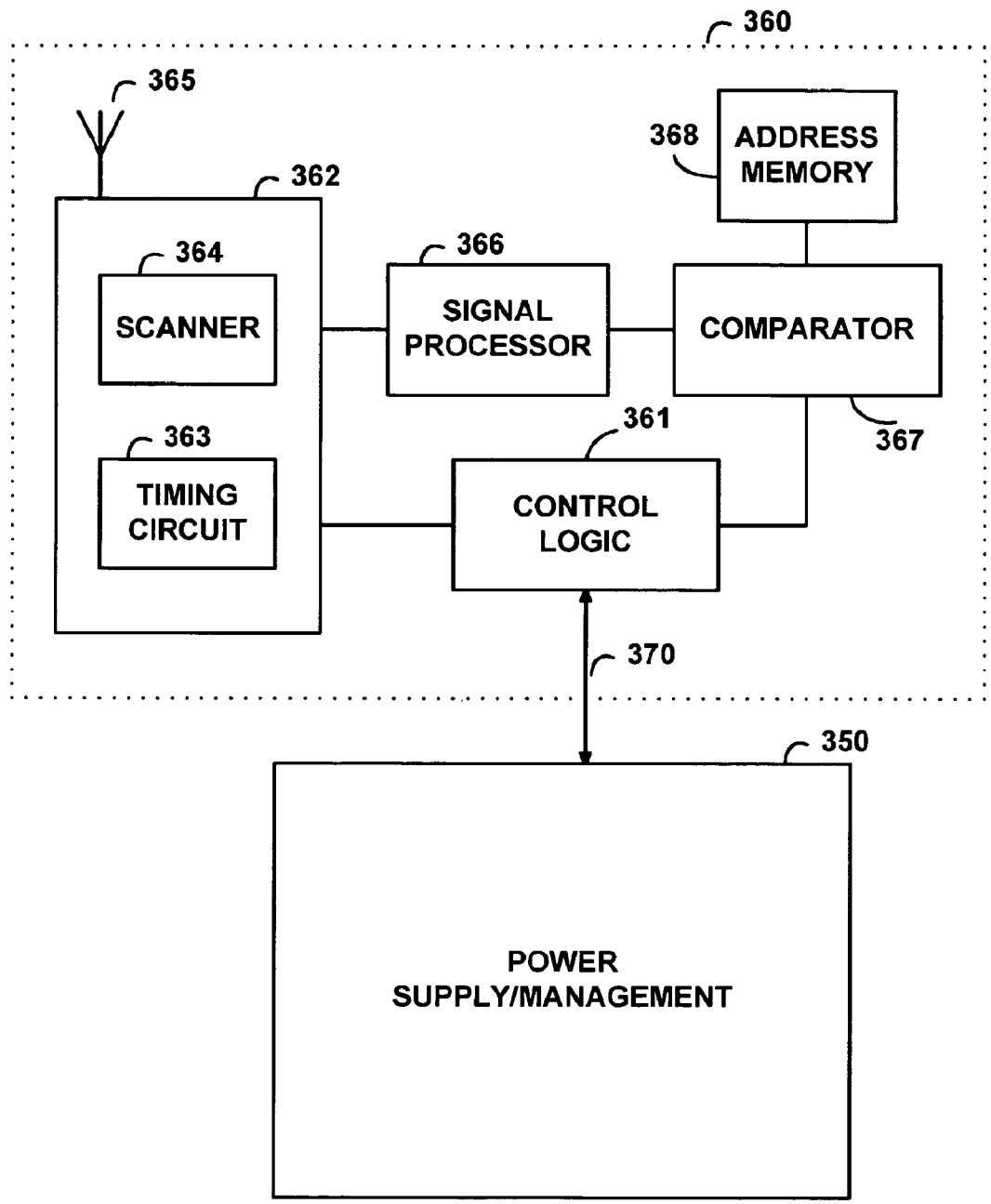
FIG. 5 is a block diagram illustrating various components of a board or card-based wireless LAN controller capable of generating a wake-up signal in response to receive of a wireless LAN packet containing a wake-up data sequence in accordance with at least one embodiment of the present invention.

FIG. 5 illustrates in greater detail, components that comprise the network controller 350 of FIG. 4 in accordance with at least one exemplary embodiment of this invention. The network controller shown in FIG. 5, includes control logic 361, a transceiver 362 comprised of a timing control circuit 363, an N-channel scanner 364 and an antenna 365, a signal processor 366, a comparator 367 and an address memory 368. When the computer is shut down, the power supply/management circuit 350 sends a signal over the line 370 to the control logic circuit 361 to notify the network controller 360 to enter the wireless wake-on frame detection mode. The control logic circuit 361 notifies the timing control circuit 363 of the transceiver 362 to begin the first timing sequence. The first timing sequence is an inactive wait sequence. After the first timing sequence has expired, the timing control circuit 362 activates the N-channel scanner 364 to sequentially scan each of a plurality of N wireless channels for a predetermined period of time. The timing control circuit 363 activates a timer so that each of the plurality of N-channels are scanned for a fixed period of time. During scanning, the N-channel scanner monitors a lead connected the antenna 365 over each of the N channels. Any incoming information packet received by the scanner 364 is sent to the signal processor 366. The signal processor strips the header, trailer and other miscellaneous data from the information packet to isolate the frame data containing the wake-up data sequence. This frame data is passed to the comparator 367. The comparator 367 compares the wake-up data sequence in the frame data of the information packet with the network controller's 6-byte hardware identification address stored in an address memory 368. When the wake-up data sequence of the frame data matches the address stored in the memory 367 the control logic 368 sends a signal to the power supply/management circuit 350 to wake-up the computing device over the bus 370.

Figure 6:
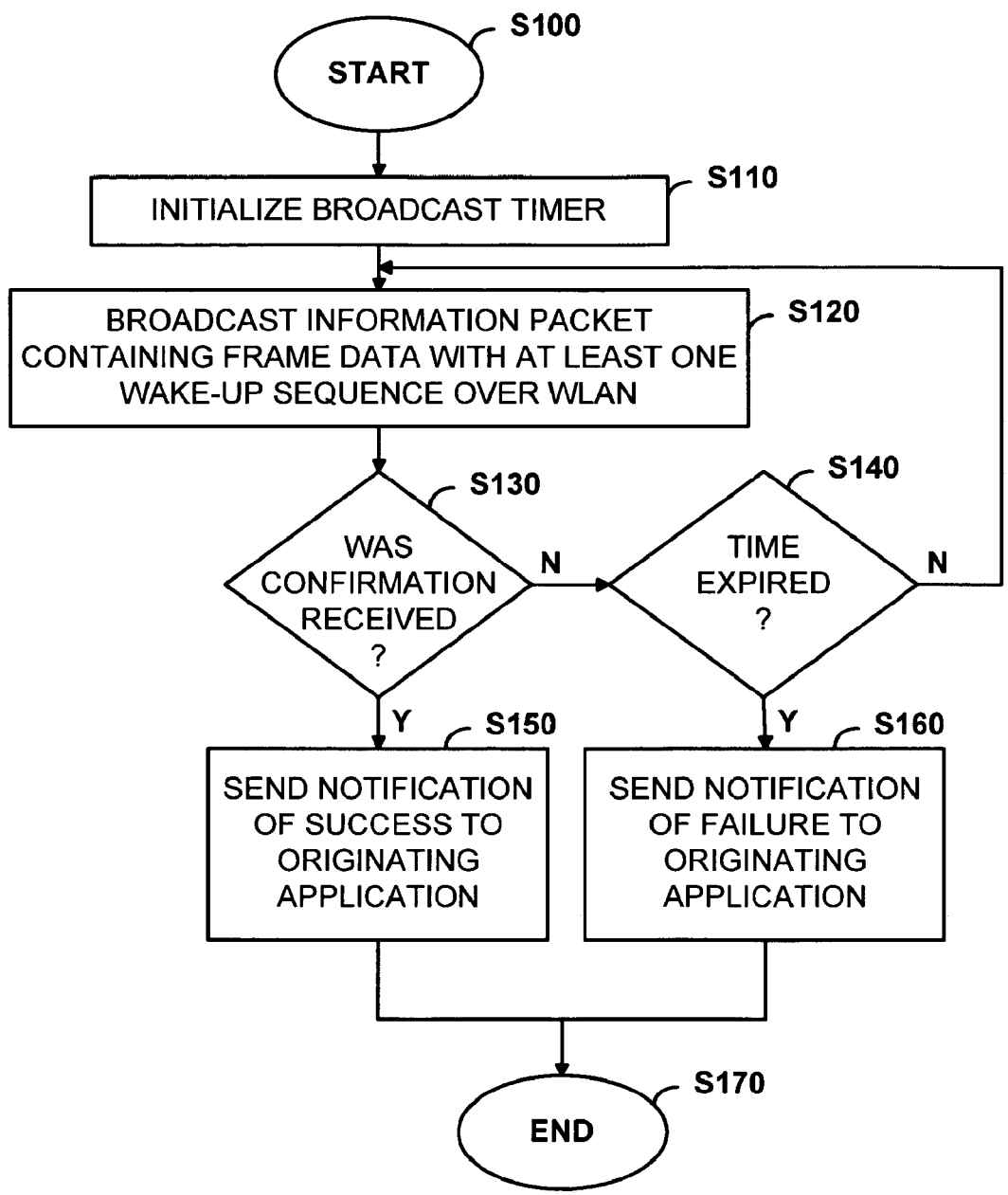
FIG. 6 is a flow chart outlining the steps of a method for broadcasting a signal over a wireless LAN for waking a wireless devices from a powered down state in accordance with at least one embodiment of the present invention.

FIG. 6 is a flow chart outlining the steps of a method for sending an information packet containing a wake-up data sequence over a wireless LAN in accordance with at least one embodiment of this invention. Operation of the method begins in step S100 and proceeds to step S110 where a broadcast timer is initialized. The broadcast timer determines the amount of time that the information packet containing the wake-up data sequence is broadcast for. Next, in step S120, an information packet carrying a frame containing at least one wake-up data sequence is broadcast over the wireless LAN by a wireless access point. Operation of the method then proceeds to step s130. In step S130, a determination is made whether a confirmation has been received that the frame data was successfully received by the desired node and that the node has been woken and re-established connection to the LAN. If, in step S130, it is determined that no confirmation has been received, operation of the method proceeds to step S140 where a determination is made whether a predetermined time for receiving a confirmation signal has expired. As long as the predetermined time has not expired, operation of the method returns to step S120 where the frame containing the wake-up data sequence is rebroadcast. Otherwise, if in step S140 it is determined that the predetermined time has expired, operation of the method proceeds to step S160 where a notice that the server was unsuccessful in waking the remote device is sent to the application which originated the wake-up signal. Operation of the method then terminates in step S170.

Returning to step S130, if in step S130 it is determined that a confirmation has been received, operation proceeds to step S150. In step S150 a notification signal is sent to the application which originated the wake-up signal notifying the application that the particular node has been successfully woken. Operation of the method then terminates in step S170.

Figure 7:
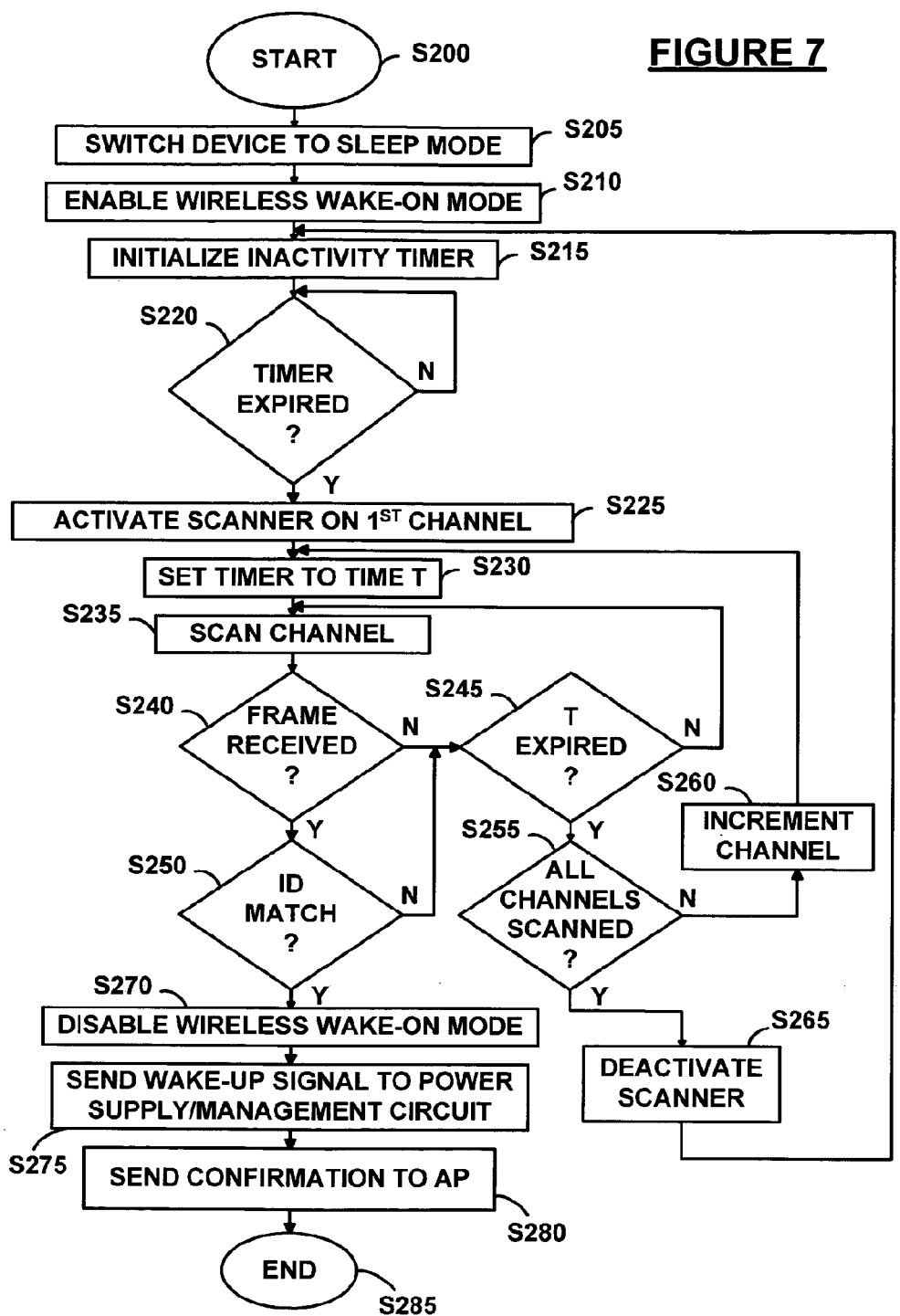
FIG. 7 is a flow chart illustrating in greater detail the operation of a wireless network controller during a powered down mode including scanning a plurality of wireless data channels for information packet containing wake-up data sequence frame and exiting the powered down mode upon receipt of the wake-up data sequence frame in accordance with at least one embodiment of this present invention.

FIG. 7 is a flow chart outlining the steps of a method of scanning for and receiving an information packet carrying frame data having a wake-up data sequence in accordance with at least one embodiment of this invention Operation of the method begins in step S200 and proceeds to step S205 where the wireless computing device enters the sleep mode. Next, in step S210, the network controller of the wireless computing device enters the wake-up data sequence detection mode in response to a signal from the power supply/management circuit that the device has entered the sleep mode. Then, operation of the method proceeds to step S215 where the inactivity timer TI is initiated. The inactivity timer Ti counts down a predetermined inactivity time to wait prior to scanning for wake-up signals and between successive scans for wake-up signals. Next, in step S220, a determination is repeatedly made as to whether the inactivity timer Ti has expired. Until it is determined that the inactivity timer Ti has expired, the determination of step S220 is repeated. Otherwise, processing proceeds to step S225.

In step S225 the scanning receiver is activated to scan for an information packet containing a wake-up data sequence on the first data channel. Next, in step S230, a channel scanning timer is activated which sets the time that the receiver monitors the current channel. Then, in step S235, scanning of the channel begins. After a period of delay less than the timer T, processing proceeds to step S240. In step S240, a determination is made whether an information packet has been received on the current channel. If, in step S240, it is determined that an information packet has been received on the current channel, operation of the method proceeds to step S250. Otherwise, operation proceeds to step S245. In step S245, a determination is made whether channel scanning timer has expired. If, in step S245, it is determined that the scanning timer has expired, operation of the method proceeds to step S255. Otherwise, operation of the method jumps back to step S235 where the channel continues to be scanned.

In step S255, a determination is made whether all N channels have been scanned. If, in step S255, it is determined that all N channels have been scanned, operation advances to step S265 where the scanning receiver is deactivated. Then operation returns to step S215 where the inactivity timer is again started. Otherwise, if at S255, it is determined that all channels have not be scanned, operation advances to step S260 where the current channel is incremented to the next channel and then returns to step S230 where the timer is restarted.

Returning to step S250, if a positive determination is made in step S240, a determination is made whether the wake-up data sequence in the data frame received on the current channel contains a properly formatted wake-up data sequence which specifically identifies the LAN controller of the device. If, in step S250, it is determined that the information packet does contain a properly formatted wake-up data sequence, operation proceeds to step S270. Otherwise, operation goes to step S245. In step S270, the wake-up data sequence detecting mode is disabled. Then, operation of the method proceeds to step S275 where a signal is sent to the power supply/management circuit to wake-up the device. Next, in step S280, a confirmation signal is sent by the LAN controller to the wireless access point to notify the application that originated the wake-up that node has been successfully woken. Finally, operation of the method terminates in step S285.

While the foregoing description includes many details and specificities, it is to be understood that these have been included for purposes of explanation only, and are not to be interpreted as limitations. Many modifications and equivalent substitutions to the embodiments described above can be made without departing from the spirit and scope of the invention.

What is claimed is:

1. A method comprising:
   initiating the transmission of a wake-up packet on a wireless local area network, wherein the wake-up packet is configured to cause a wireless device to transition from operating in a first power mode to operating in a second power mode;
   initiating the transmission of a confirmation message to a requesting application if a confirmation packet has been received from the wireless device in response to the wake-up packet, wherein the confirmation message indicates that the wireless device has transitioned from operating in the first power mode to operating in the second power mode;
   periodically reinitiating the transmission of the wake-up packet for a retransmission timeframe if a conformation packet has not been received from the wireless device in response to the wake-up packet; and
   initiating the transmission of a failure message to the requesting application if a confirmation packet has not been received from the wireless device in response to the wake-up packet before the retransmission timeframe has elapsed.

2. The method of claim 1, wherein the wireless device has a wireless hardware address, and wherein the wake-up packet comprises multiple consecutive iterations of the hardware address of the wireless device.

3. The method of claim 1, wherein the wake-up packet is a broadcast packet addressed to a plurality of wireless devices on the wireless local area network.

4. The method of claim 3, wherein the wake-up packet is configured to cause each wireless device of the plurality of wireless devices on the wireless local area network currently operating in the first power mode to initiate the transition from the first power mode to the second power mode.

5. The method of claim 1, wherein the power required for operating the wireless device in the first power mode is less than the power required for operating the wireless device in the second power mode.

6. A system comprising:
a controller configured to:
initiate the transmission of a wake-up packet on a wireless local area network, wherein the wake-up packet is configured to cause a wireless device to transition from operating in a first power mode to operating in a second power mode,
if a confirmation packet has not been received from the wireless device in response to the wake-up packet, initiate the transmission of a confirmation message to a requesting application;
if a conformation packet has not been received from the wireless device in response to the wake-up packet, periodically reinitiate the transmission of the wake-up packet for a retransmission timeframe; and
if a confirmation packet has not been received from the wireless device in response to the wake-up packet before the retransmission timeframe has elapsed, initiate the transmission of a failure message to the requesting application.

7. The system of claim 6, wherein the wireless device has a wireless hardware address, and wherein the wake-up packet comprises multiple consecutive iterations of the hardware address of the wireless device.

8. The system of claim 6, wherein the wake-up packet is a broadcast packet addressed to a plurality of wireless devices on the wireless local area network.

9. The system of claim 8, wherein the wake-up packet is configured to cause each wireless device of the plurality of wireless devices on the wireless local area network currently operating in the first power mode to initiate the transition from the first power mode to the second power mode.

10. The system of claim 6, wherein the power required for operating the wireless device in the first power mode is less than the power required for operating the wireless device in the second power mode.

11. An apparatus comprising:
means for initiating the transmission of a wake-up packet on a wireless local area network, wherein the wake-up packet is configured to cause a wireless device to transition from operating in a first power mode to operating in a second power mode;
means for initiating the transmission of a confirmation message to a requesting application if a confirmation packet has been received from the wireless device in response to the wake-up packet, wherein the confirmation message indicates that the wireless device has transitioned from operating in the first power mode to operating in the second power mode;
means for periodically reinitiating the transmission of the wake-up packet for a retransmission timeframe if a conformation packet has not been received from the wireless device in response to the wake-up packet; and
means for initiating the transmission of a failure message to the requesting application if a confirmation packet has not been received from the wireless device in response to the wake-up packet before the retransmission timeframe has elapsed.

12. The apparatus of claim 11, wherein the wireless device has a wireless hardware address, and wherein the wake-up packet comprises multiple consecutive iterations of the hardware address of the wireless device.

13. The apparatus of claim 11, wherein the wake-up packet is a broadcast packet addressed to a plurality of wireless devices on the wireless local area network.

14. The apparatus of claim 13, wherein the wake-up packet is configured to cause each wireless device of the plurality of wireless devices on the wireless local area network currently operating in the first power mode to initiate the transition from the first power mode to the second power mode.

15. The apparatus of claim 11, wherein the power required for operating the wireless device in the first power mode is less than the power required for operating the wireless device in the second power mode.

16. A non-transitory computer-readable medium having instructions stored thereon, the instructions comprising:
instructions for initiating the transmission of a wake-up packet on a wireless local area network, wherein the wake-up packet is configured to cause a wireless device to transition from operating in a first power mode to operating in a second power mode;
instructions for initiating the transmission of a confirmation message to a requesting application if a confirmation packet has been received from the wireless device in response to the wake-up packet, wherein the confirmation message indicates that the wireless device has transitioned from operating in the first power mode to operating in the second power mode;
instructions for periodically reinitiating the transmission of the wake-up packet for a retransmission timeframe if a conformation packet has not been received from the wireless device in response to the wake-up packet; and
instructions for initiating the transmission of a failure message to the requesting application if a confirmation packet has not been received from the wireless device in response to the wake-up packet before the retransmission timeframe has elapsed.

17. The non-transitory computer-readable medium of claim 16, wherein the wireless device has a wireless hardware address, and wherein the wake-up packet comprises multiple consecutive iterations of the hardware address of the wireless device.

18. The non-transitory computer-readable medium of claim 16, wherein the wakeup packet is a broadcast packet addressed to a plurality of wireless devices on the wireless local area network.

19. The non-transitory computer-readable medium of claim 18, wherein the wake-up packet is configured to cause each wireless device of the plurality of wireless devices on the wireless local area network currently operating in the first power mode to initiate the transition from the first power mode to the second power mode.

20. The non-transitory computer-readable medium of claim 16, wherein the power required for operating the wireless device in the first power mode is less than the power required for operating the wireless device in the second power mode.

* * * * *

UNITED STATES PATENT AND TRADEMARK OFFICE
CERTIFICATE OF CORRECTION

PATENT NO. : 8,452,998 B2
APPLICATION NO. : 13/361472
DATED : May 28, 2013
INVENTOR(S) : Michael Paljug Page 1 of 1

It is certified that error appears in the above-identified patent and that said Letters Patent is hereby corrected as shown below:

In the Claims:

In Claim 6, Column 11, Line 24, please delete "has not been received" and insert --has been received--.

Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,452,998 B2 | |
| APPLICATION NO. | : 13/361472 | |
| DATED | : May 28, 2013 | |
| INVENTOR(S) | : Paljug | |

It is certified that error appears in the above-identified patent and that said Letters Patent is hereby corrected as shown below:

On the Title Page, delete Item "(60)" and insert Item -- (62) --, therefor.

Title Page 2, Item (56), under "OTHER PUBLICATIONS", in Column 2, Line 13, delete "Wrritten" and insert -- Written --, therefor.

In the Specification

In Column 4, Line 59, delete "of an" and insert -- of a --, therefor.

In Column 7, Line 60, delete "network controller 350" and insert -- network controller 360 --, therefor.

In Column 7, Lines 60-61, delete "power supply/management circuit 360," and insert -- power supply/management circuit 350, --, therefor.

In Column 7, Lines 62-63, delete "network controller 350" and insert -- network controller 360 --, therefor.

In Column 8, Line 1, delete "network controller 350." and insert -- network controller 360. --, therefor.

In Column 8, Lines 2-3, delete "power supply/management circuit 360" and insert -- power supply/management circuit 350 --, therefor.

In Column 8, Line 6, delete "network controller 350" and insert -- network controller 360 --, therefor.

In Column 8, Line 14, delete "network controller 350" and insert -- network controller 360 --, therefor.

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,452,998 B2

In Column 8, Line 35, delete "power supply/management circuit 360" and insert -- power supply/management circuit 350 --, therefor.

In Column 8, Line 45, delete "network controller 350" and
insert -- network controller 360 --, therefor.

In Column 8, Line 58, delete "timing control circuit 362" and
insert -- timing control circuit 363 --, therefor.

In Column 9, Line 22, delete "step s130." and insert -- step S130. --, therefor.

In the Claims

In Column 12, Line 53, in Claim 18, delete "wakeup" and insert -- wake-up --, therefor.